(12) United States Patent
Ramsey et al.

(10) Patent No.: US 9,187,221 B2
(45) Date of Patent: *Nov. 17, 2015

(54) CAN ENDS HAVING MACHINE READABLE INFORMATION

(71) Applicant: Crown Packaging Technology, Inc., Alsip, IL (US)

(72) Inventors: Christopher Paul Ramsey, Wantage (GB); Laura Jane Vaughan, Eglinton (GB)

(73) Assignee: Crown Packaging Technology, Inc., Alsip, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/628,968

(22) Filed: Sep. 27, 2012

(65) Prior Publication Data

US 2014/0084003 A1 Mar. 27, 2014

Related U.S. Application Data

(60) Provisional application No. 61/539,784, filed on Sep. 27, 2011.

(51) Int. Cl.
| | |
|---|---|
| *B65D 17/00* | (2006.01) |
| *B65D 51/24* | (2006.01) |
| *B65B 43/00* | (2006.01) |
| *B65D 51/00* | (2006.01) |
| *B23K 26/36* | (2014.01) |
| *B21D 51/38* | (2006.01) |

(52) U.S. Cl.
CPC ............ *B65D 51/245* (2013.01); *B23K 26/365* (2013.01); *B65B 43/00* (2013.01); *B65D 51/00* (2013.01); *B21D 51/383* (2013.01); *B65D 2517/0053* (2013.01)

(58) Field of Classification Search
CPC . G09F 3/0297; G09F 3/0298; G09F 23/0091; G09F 23/02; B65D 17/165
USPC ............................................ 40/306; 220/270
See application file for complete search history.

(56) References Cited

U.S. PATENT DOCUMENTS

| | | | |
|---|---|---|---|
| 3,898,417 | A | 8/1975 | Atkinson |
| 4,375,025 | A | 2/1983 | Carlson |
| 4,476,781 | A | 10/1984 | Kubacki et al. |
| 4,559,961 | A | 12/1985 | Anderson et al. |
| 5,053,440 | A | 10/1991 | Schueler et al. |
| 5,273,149 | A | 12/1993 | Aldrich et al. |
| 5,350,792 | A | 9/1994 | Hess et al. |

(Continued)

FOREIGN PATENT DOCUMENTS

| | | |
|---|---|---|
| CA | 2301655 | 3/1999 |
| CA | 2307074 | 9/2001 |

(Continued)

OTHER PUBLICATIONS

U.S. Appl. No. 14/345,547: Non-Final Office Action, dated Feb. 20, 2015, 10 pages.

(Continued)

*Primary Examiner* — Gary Hoge
(74) *Attorney, Agent, or Firm* — Baker & Hostetler LLP (57) ABSTRACT

A system and method for laser marking can end, including a can end center panel and/or pull tab. The decorated can end and/or tabs may have a machine readable image.

33 Claims, 11 Drawing Sheets

(56) References Cited

U.S. PATENT DOCUMENTS

| | | | |
|---|---|---|---|
| 5,489,639 A | 2/1996 | Faber et al. | |
| 5,492,077 A * | 2/1996 | Rose | 116/307 |
| 5,511,920 A | 4/1996 | Artrip | |
| 5,578,120 A | 11/1996 | Takahashi et al. | |
| 5,682,983 A * | 11/1997 | Weaver et al. | 206/150 |
| 5,884,079 A | 3/1999 | Furusawa | |
| 5,911,921 A | 6/1999 | Takai et al. | |
| 5,928,780 A | 7/1999 | Schmidt et al. | |
| 6,017,972 A | 1/2000 | Harris et al. | |
| 6,019,831 A | 2/2000 | Scmidt et al. | |
| 6,080,958 A | 6/2000 | Miller et al. | |
| 6,105,806 A | 8/2000 | Stasiuk | |
| 6,157,314 A | 12/2000 | Loftus | |
| 6,433,302 B1 | 8/2002 | Miller et al. | |
| 6,476,349 B1 | 11/2002 | Jendick | |
| 6,479,787 B1 | 11/2002 | Jendick | |
| 6,498,318 B1 | 12/2002 | Miller et al. | |
| 6,501,046 B1 | 12/2002 | Miller et al. | |
| 6,590,183 B1 | 7/2003 | Yeo | |
| 6,602,595 B2 | 8/2003 | Yadav et al. | |
| 6,706,995 B2 | 3/2004 | Miller et al. | |
| 6,777,098 B2 | 8/2004 | Yeo | |
| 6,854,947 B2 | 2/2005 | Lee | |
| 6,926,487 B1 | 8/2005 | Jendick | |
| 7,150,597 B2 | 12/2006 | Lee | |
| 7,485,403 B2 | 2/2009 | Khan | |
| 7,914,640 B2 * | 3/2011 | Ronnberg | 156/256 |
| 2001/0011431 A1 | 8/2001 | Elias | |
| 2003/0192211 A1* | 10/2003 | Elias | 40/306 |
| 2004/0108237 A1* | 6/2004 | McClintock | 206/459.1 |
| 2005/0045637 A1* | 3/2005 | Rohr et al. | 220/269 |
| 2005/0270358 A1 | 12/2005 | Kuchen et al. | |
| 2007/0080229 A1 | 4/2007 | Longacre, Jr. et al. | |
| 2009/0117353 A1 | 5/2009 | Stubbs et al. | |
| 2010/0015558 A1 | 1/2010 | Jarvis et al. | |
| 2010/0058630 A1* | 3/2010 | Elias | 40/306 |
| 2010/0264215 A1* | 10/2010 | Pinchen et al. | 235/385 |
| 2011/0084051 A1 | 4/2011 | Reed et al. | |
| 2011/0111142 A1 | 5/2011 | Kim et al. | |
| 2011/0226636 A1 | 9/2011 | Petti | |
| 2013/0196037 A1 | 8/2013 | O'Brien et al. | |
| 2013/0270269 A1* | 10/2013 | Lewis | 220/270 |

FOREIGN PATENT DOCUMENTS

| | | |
|---|---|---|
| DE | 10254060 | 2/2004 |
| EP | 0522370 | 1/1993 |
| EP | 0797511 | 10/1997 |
| EP | 0993964 | 4/2000 |
| EP | 1113901 | 7/2001 |
| EP | 1365923 | 12/2003 |
| GB | 2309215 | 7/1997 |
| JP | 11001065 | 6/1999 |
| JP | 2011/020701 | 2/2011 |
| JP | 2011020701 A * | 2/2011 |
| JP | 4982340 | 7/2012 |
| WO | WO 95/30546 | 11/1995 |
| WO | WO 97/11892 | 4/1997 |
| WO | WO 99/09853 | 3/1999 |
| WO | WO 00/03832 | 1/2000 |
| WO | WO 00/43456 | 7/2000 |
| WO | WO 01/83308 | 11/2001 |
| WO | WO 02/068205 | 9/2002 |
| WO | WO 2005/068207 | 7/2005 |
| WO | WO 2007/007102 | 1/2007 |
| WO | WO 2009/093028 | 7/2009 |

OTHER PUBLICATIONS

Machine Translation of Foreign Patent Document JP 2011-020701, Feb. 3, 2011, 106 pages.

* cited by examiner

CAN ENDS HAVING MACHINE READABLE INFORMATION

CROSS-REFERENCE TO RELATED APPLICATIONS

This claims the benefit of U.S. Patent Application Ser. No. 61/539,784 filed Sep. 27, 2011, the disclosure of which is hereby incorporated by reference as if set forth in its entirety herein.

BACKGROUND

This invention relates to containers, and more particularly to marking components of metal cans with machine readable information.

Two piece metal cans include a can body on which a can end is attached by a seam. Commercial two piece beverage cans are formed by a drawing and ironing process that forms the body sidewall integral with the base. Three piece metal cans include a cylindrical body, each end of which has a can end attached by a seam.

Two piece beverage cans are produced in vast quantities for beverages and foods use; three piece beverage cans are produced in vast quantities for food uses. Accordingly, the components of the cans must be produced at high speeds.

Conventional beverage cans and many easy open food cans have pull tabs. Pull tabs are formed from metal sheet in a tab press. Because of the quantities required, conventional tab presses form multiple tabs at once in lanes of two, three, or four tabs.

Typically, pre-lacquered coil of aluminum is fed into a shell press to form the can end shells. A pre-lacquered coil of aluminum is fed into a tab press to form the pull tabs. The shells and pull tabs are combined in a conversion press to form the unseamed can end.

Decoration of can ends, especially pull tabs, is known. For example, U.S. Pat. No. 6,105,806 discloses laser etching or removal of portions of a coating on a pull tab. U.S. Pat. No. 6,498,318 acknowledges difficulties in marking metal cans and discloses ablating metal pull tab stock.

The inventors are aware of a commercial, conventional system for laser etching pull tabs that includes a CO2 laser that often operates at about 100 W. Each lane of a tab press has its own laser such that the tab press can operate at about 700 tabs per minute with a laser having a resolution or dimension of approximately 100 microns. Typically, a dark coloured lacquer is removed by the laser to expose bare aluminum in the form of a simple logo or a few characters. The limitation on the process speed is also a limitation on the amount of decoration.

Laser marking of coatings is employed for flexible and card packaging for various marking applications. Typically, a thermally active pigment is loaded into a transparent or light colored lacquer, and a CO2 laser induces a color change. For example, a laser may be applied to a white lacquer label to display black text. Laser marking systems of this type are available from Sun Chemical, under the trade name Sunlase and employ a 100 micron YAG laser.

SUMMARY

A process for high speed, high resolution decoration by laser marking for can ends, especially can end center panels, can end chuck walls, and can pull tabs, is provided. The can ends and pull tabs resulting from the process are also provided.

The method of decorating can ends comprises the steps of: providing a can end substrate, such as a can end center panel, chuck wall, and/or pull tab, of a metal material, such as aluminum, or in some cases steel; coating at least a portion of the can end substrate, preferably with a lacquer, that includes a photonically active component; and applying a laser to the coated substrate to change an appearance of at least a portion of the photonically active component substantially without burning, etching, or ablating the lacquer, thereby forming an image.

Preferably the photonically active component includes a thermally active pigment. Preferably the change in appearance is a change in color, such as from transparent or light color to an opaque or darker color.

Preferably, a CO2 laser is employed that has a beam width that is less than approximately 50 microns, more preferably no more than approximately 30 microns, more preferably no more than approximately 10 microns, and preferably approximately 5 microns. Accordingly the image may be formed by dots that have a dimension of less than approximately 50 microns, preferably no more than approximately 30 microns, more preferably no more than approximately 10 microns, and preferably approximately 5 microns. Accordingly the image may be formed by dots that have a dimension of less than approximately 50 microns.

The inventors contemplate that the laser marking process may be applied to end stock or tab stock coil, applied to the tabs after the tab press before the conversion press, applied to the end shells after the shell press before the conversion press, or after the conversion press to the unseamed can end.

The inventors surmise that the decorated ends may be suitable for withstanding pasteurization at up to 75 C for 20 minutes, such as may be encountered by beverage can ends after seaming. Also, the inventors surmise that the decorated ends may be suitable for withstanding retort temperatures of up to 131 C for 90 minutes, such as may be encountered by food can ends after seaming. Accordingly, the inventive method includes the pasteurization or retort steps.

A decorated can end comprises: an end shell and a pull tab, each one of the end shell and the pull tab comprising preferably aluminium, but also possibly steel, and a coating, the coating comprising a lacquer and a photonically active component; and an image applied to at least one of a center panel of the end shell and an underside of the pull tab, the image formed by application of a laser that changes an appearance of at least a portion of the photonically active component substantially without burning, etching, or ablating the lacquer.

Preferably, the image is a color that is darker than the lacquer. Also preferably, the image may be formed by dots, and the dots have a dimension of less than approximately 50 microns, preferably no more than approximately 30 microns, more preferably no more than approximately 10 microns, and preferably approximately 5 microns.

Also, a decorated can end is provided that has machine readable codes, such as QR codes on the center panel. The end has (i) an unopened configuration in which the end is sealed and (ii) an opened configuration in which the beverage contents of the can are accessible. The can end comprises an end shell and a pull tab. The pull tab has an orientation that is approximately parallel to a center panel of the end shell in the unopened configuration, and is capable of being actuated to a part vertical position by lifting an end of the pull tab to rupture a score on the center panel and thereby achieve the opened configuration. Preferably the can end is an aluminum beverage can end. Ends of other materials or uses may also be employed, such as aluminum or steel ends for food cans. The term "part vertical" is used to describe the position of the pull tab at which rupture and opening of the pour opening panel of a beverage end occurs. When used with food can ends, it is the position of the pull tab at which opening of the relevant portion of the panel occurs.

The plural images, such as QR codes distributed about a rivet that couples the tab to the center panel, are located on a center panel of the end shell, each one of the images being machine-readable. The plural images are located on the center panel such that the pull tab obscures a portion of each one of the images regardless of the rotational position of the pull tab. Thus, none of the plural images are readable when the beverage can is in its unopened configuration. Then, at least one of the images is fully exposed, intact, and capable of being read by a machine upon the tab being actuated to its part vertical position, even if the tear panel of the end is displaced.

The images may be formed from ink jet printing, laser etching, and/or by another other means understood in the art. The end may be aluminum or steel. The images also may be formed by application of a laser that changes an appearance of at least a portion of a photonically active component substantially without burning, etching, or ablating the lacquer.

A method of providing information on a can end described above is also provided. The method comprises the steps of: providing a metal beverage can end including: an end shell, a pull tab, and plural images located on a center panel of the end shell, each one of the images being machine-readable, the plural images being located on the center panel such that the pull tab obscures a portion of each one of the images regardless of the rotational position of the pull tab such that none of the plural images are readable; and lifting an end of the pull tab until the pull tab is part vertical to rupture a score on the center panel, whereby in the part vertical position at least one of the images is fully exposed, intact, and capable of being read by a machine. The step of reading the image is performed with a machine while the tab is in a part vertical position.

A can end is provided that is capable of having (i) an unopened configuration in which the end is sealed and (ii) an opened configuration in which, after application of the end to a can body, the contents of the can are accessible. The can end comprises: an end shell and a pull tab, the pull tab having an orientation that is approximately parallel to a center panel of the end shell in the unopened configuration, the pull tab being capable of being actuated to a part vertical position by lifting an end of the pull tab to rupture a score on the center panel and thereby achieve the opened configuration; and a machine readable image located on either one of a topside and underside of the tab, the machine readable image having a size of no more than 6 mm by 6 mm.

Preferably the machine readable code has a size of at least 2 mm by 2 mm, or at least 3 mm by 3 mm, and more preferably, at least 4 mm by 4 mm and no more than 5 mm by 5 mm. Preferably, the machine readable code is a matrix barcode having 14 by 14 modules.

Preferably, the machine that reads the information formed by the photonically sensitive ink is a handheld wireless communication device, which is intended to mean a smart phone of the type operated by a ubiquitous, common users (in other words, a "smartphone," such as an iphone or phone operating on an Android operating system, equipped with a camera and the ability to download applications), as distinguished from the type of industrial readers of one dimensional or two dimensional bar code readers that are employed for manufacturing or inventory purposes in an industrial or retail environment.

DETAILED DESCRIPTION OF PREFERRED EMBODIMENTS

The preferred marking system employs a conventional lacquer to which a photonically active component, such as a pigment, colorant, dye, or ink or like compound commercially available from Datalase, is added. A laser causes local change in the appearance—that is, visual perceptible attributes—of the photonically active component and/or lacquer. The inventors contemplate several possible arrangements or embodiments in which the laser may be applied to the photonically active components to create a color change, and thereby to form an image.

The inventors surmise that images may be formed by laser markings applied to food or beverage ends or food or beverage can pull tabs. The images broadly encompass decorations, such as logos, pictures, or aesthetically pleasing marks, or information, such as text or QR codes.

Figure 1A:
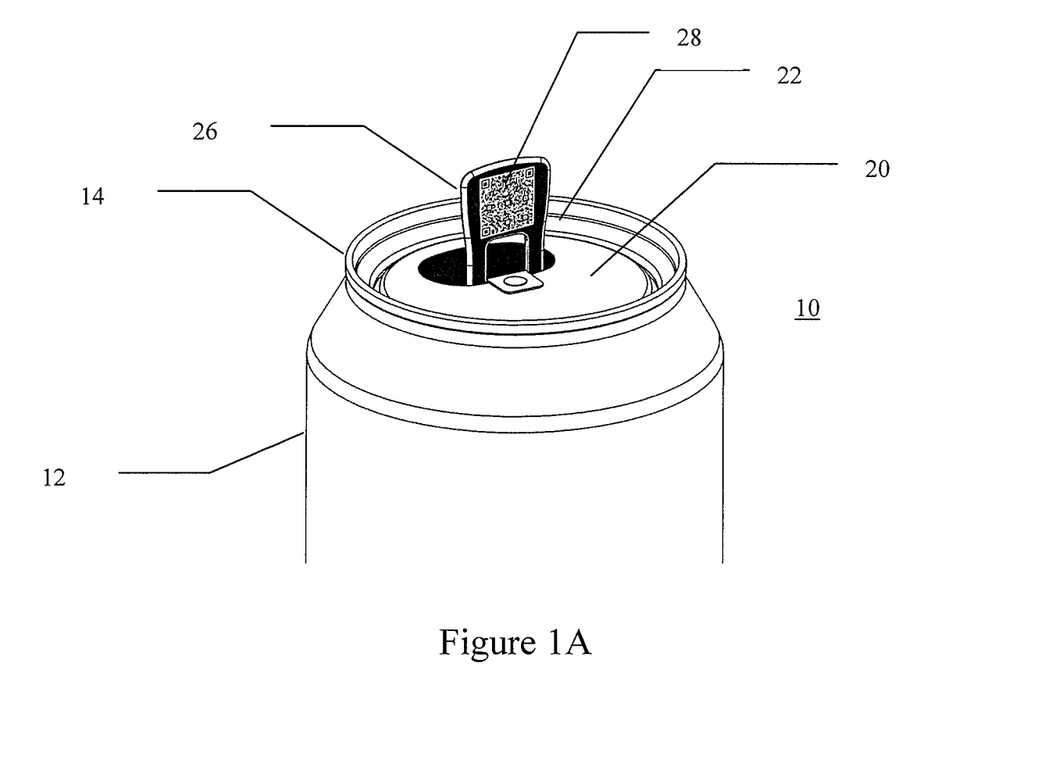
FIG. 1A is a schematic view of the can end showing the underside of the tab in its open, actuated position.

In this regard, FIG. 1A illustrates a beverage can 10 that includes a can body 12 and a seamed can end 14. End 14 includes a center panel 20 and a chuck wall 22. The finished end also includes a pull tab 26 attached to the center panel by a rivet. The pull tab is shown in its fully actuated position after it has ruptured the score to create the pour opening. An image, that is a QR code 28, is located on the underside of tab 26 such that it would be visible only after actuation of tab 26. The present invention is not limited to beverage can ends, but encompasses other ends, such as ends on food cans.

Figure 1B:
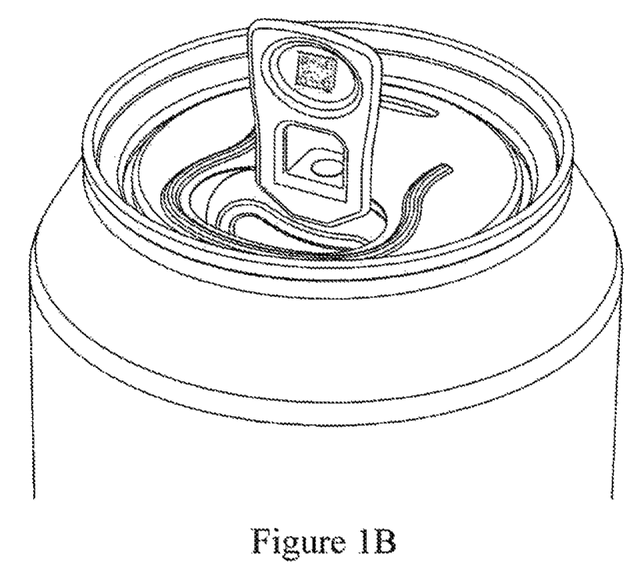
FIG. 1B is a view of a first embodiment can end showing the upper side of the tab in its open, actuated position.
Figure 1C:
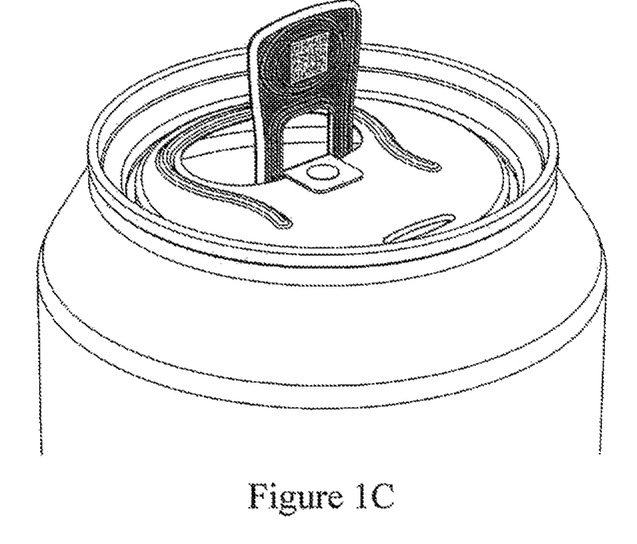
FIG. 1C is a view of the first embodiment can end showing the underside of the tab in its open, actuated position.
Figure 1D:
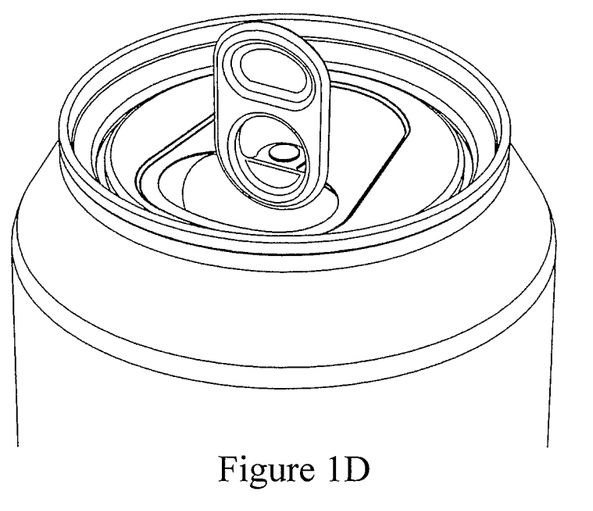
FIG. 1D is a view of a second embodiment can end showing the upper side of the tab in its open, actuated position.
Figure 1E:
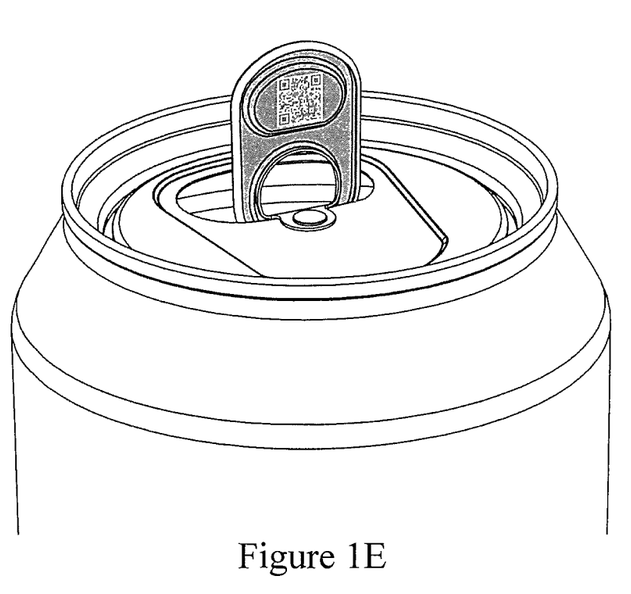
FIG. 1E is a view of the first embodiment can end showing the underside of the tab in its open, actuated position

FIGS. 1B and 1C illustrate a beverage can end having a configuration known in the industry as a DRT end. FIGS. 1D and 1E illustrate a beverage can end having a configuration known in the industry as a Stolle end. Each of the embodiments in the figures has a QR code printed on the tab underside.

The present invention encompasses machine readable codes formed on the underside of the tab, the top side of the tab (not shown in the figures), and both. The machine readable code encompasses matrix barcode or two dimensional barcode, including but not limited to QR codes, Data Matrix codes, and inverses of the same.

The inventors have determined that the two dimensional code on either the underside or the topside of the tab is no more than approximately 6 mm×6 mm, and most preferably about 5 mm×5 mm. The minimum size depends on the resolution and speed of the laser, printer, or other means for forming the code, the speed of the moving tab stock or dwell time of the stationary tab stock or tabs during marking, and the resolution capability of the wireless communication device and software for sensing and processing the data. Preferably, the minimum size is 2 mm×2 mm, 3 mm×3 mm, or 4 mm×4 mm, allowing for foreseeable advances in technology.

The machine readable code may be formed by any means, including a process of applying a laser to photonically sensitive ink described herein, conventional laser etching, conventional printing, and the like. U.S. patent application Ser. No. 13/584,521, entitled, "Laser Marking System And Method" describes a preferred method of marking while tab stock is continuously moving, and the present invention encompasses marking during the dwell period as the tab stock moves into the tab press or as the tab moves into the conversion press.

As an example for the use of the machine readable code (such as a QR code or Data Matrix code or their inverses) on a tab, a user may scan the code on the tab or elsewhere on the container using a wireless communication device that links to a software download site that automatically installs an application, commonly referred to as an "app." The app may display a splash screen on the wireless communication device and then display a conventional camera view on the device. If the app had previously been downloaded to the wireless communication device, downloading the app may not be necessary.

The wireless communication device may then provide instructions to 'scan back of tab' (for examples in which the tab is marked on the underside) and display a schematic showing where to find the machine readable code. According to the instructions, the user may then scan the machine readable code and a message may appear, such as 'You win—scan can for prize!'

The wireless communication device then may display another schematic with instructions to scan the container or a portion of the container that may function as a marker. The wireless communication device may in this regard interact with the container, such as displaying or downloading a video, playing or downloading a music track, providing reward points, displaying augmented reality as generally disclosed in co-pending U.S. Patent Application 61/612,064, entitled, "Device, System, and Method for Facilitating Interaction Between A Wireless Communication Device and a Package Having a Unique Identifier", or the like.

The topside code and underside codes may also interact. For example, the code on the top panel may identify the game or category, and the underside code may provide additional information, such as identifying whether the game or sweepstakes has been won.

Figure 2:
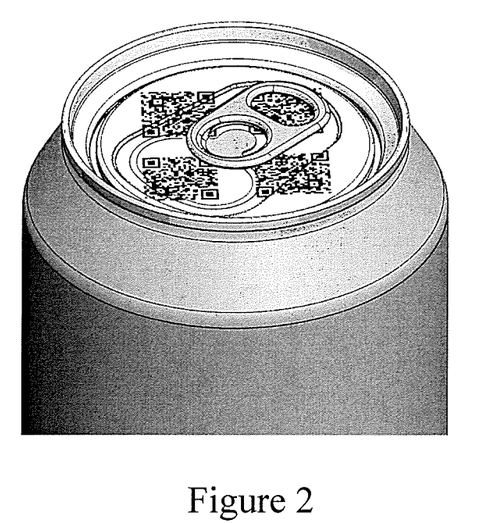
FIG. 2 is a perspective view of another embodiment can end showing an image on the can end center panel.
Figure 3A:
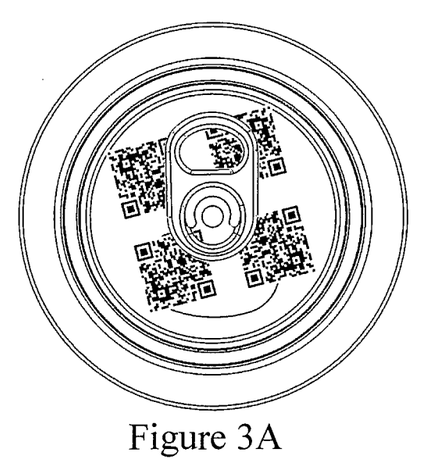
FIGS. 3A through 3F are top views of can ends having images on the center panel with the tab in various locations.
Figure 3B:
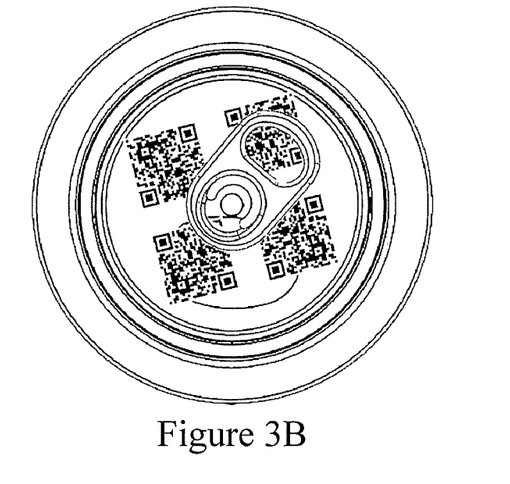
Figure 3C:
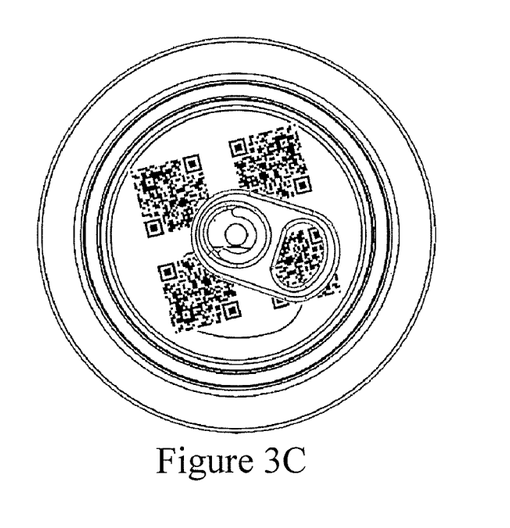
Figure 3D:
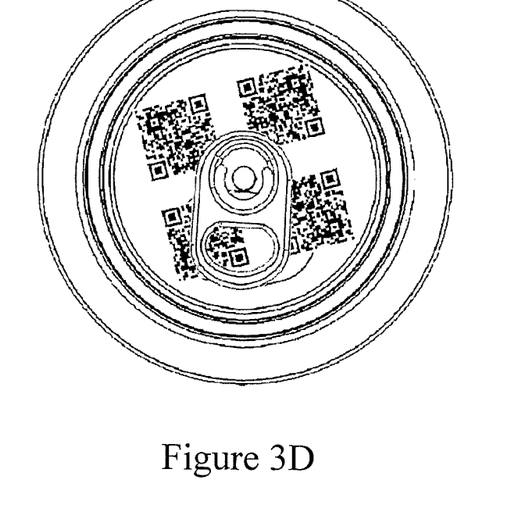
Figure 3E:
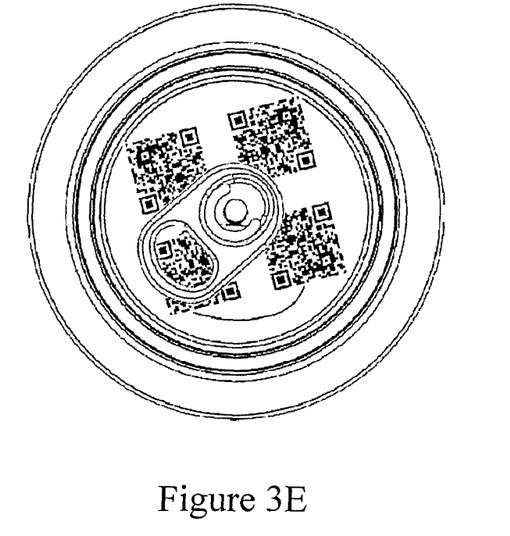
Figure 3F:
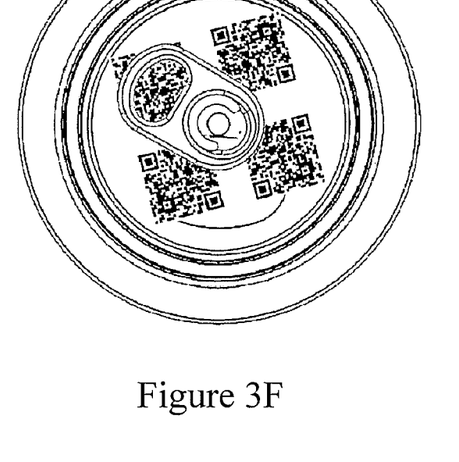

FIG. 2 is a perspective view of a beverage can having multiple images on its center panel. In the image of FIG. 2, the beverage can has a can end 14' that includes four QR codes 28' located about the center panel 20'. Codes 28' are oriented and spaced such that no code is fully unobstructed from above by the tab 26' regardless of the orientation or position of the tab while it is unactuated in its ready position as manufactured.

Each of FIGS. 3A through 3F show a can end having four QR codes 28'. In each figure, the codes are in the same position, but tab 26' is shown in various positions in FIGS. 3A through 3F to illustrate that regardless of the position of tab 26', no code 28' is fully unobstructed from above.

Figure 4A:
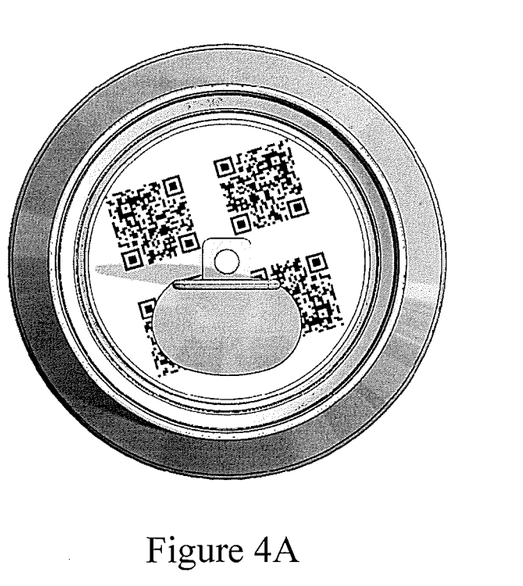
FIGS. 4A through 4C are top views of can ends having images with the tab in its actuated position.
Figure 4B:
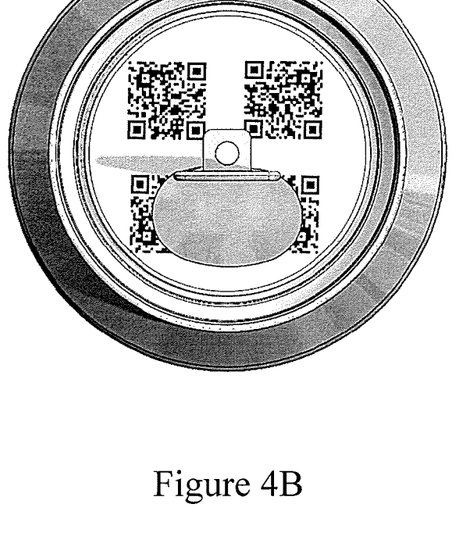
Figure 4C:
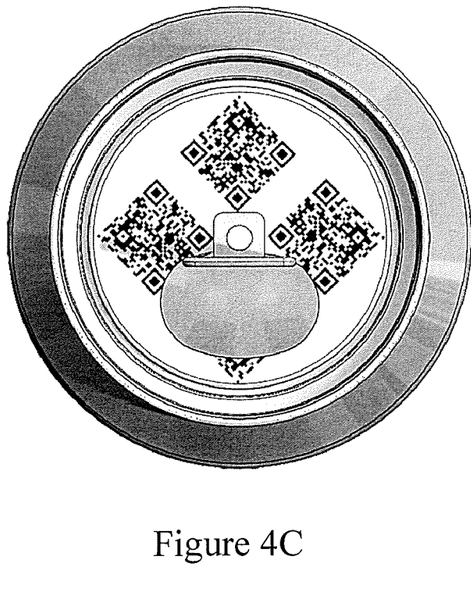

Each one of FIGS. 4A through 4C shows a unique location of the group of four QR codes 28' with the tab in the fully actuated, open position to illustrate that regardless of the location of the codes 28', at least one code is fully exposed, unbroken or contiguous, and readable from above when the tab is fully actuated to its upright position, as upon opening. It is understood that the number, spacing, and size of the codes may vary according to aesthetic and function considerations. Moreover, the embodiments shown in FIG. 4A through 4C are not limited to employing a laser as described herein, but also encompass conventional processes, such as ink jet printing to form the QR codes as described.

Figure 5:
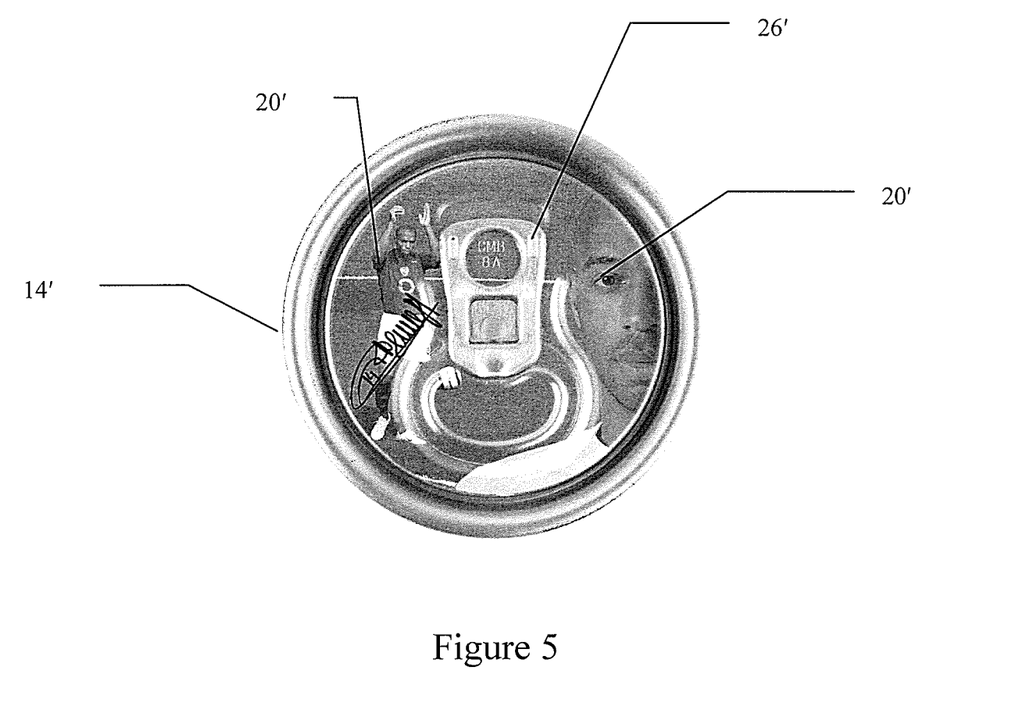
FIG. 5 is a top view of a can end showing another embodiment can end.

FIG. 5 illustrates a beverage end 14" that includes a center panel 20", chuck wall 22", and tab 26". An image 28", that is various graphics, are located on the center panel 20".

A description of the location of the application of the laser marking process in the end or pull tab manufacturing process is provided below, followed by a description of the preferred type of laser and a description of the photonically sensitive components that the inventors surmise may be employed.

Figure 6:
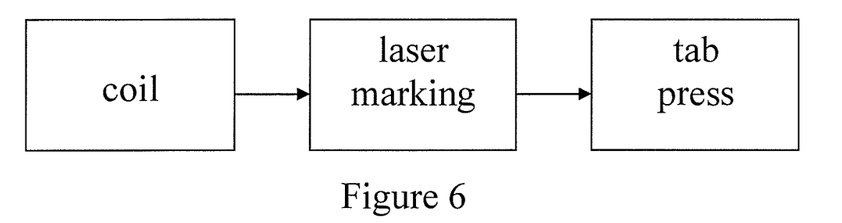
FIG. 6 is a flow chart of a manufacturing process showing a location of the laser marking process.

As illustrated in FIG. 6, the laser marking process may be performed on the tab stock coil before it enters the tab press. Known methods may be employed to register the marked coil for accurate tab forming relative to the images created by the laser marking. Thus, the output of the tab press in FIG. 6 would be marked tabs. As used herein, the term "coil" refers to the coiled metal stock and encompasses flat metal sheets that have been cut from the roll.

Figure 7:
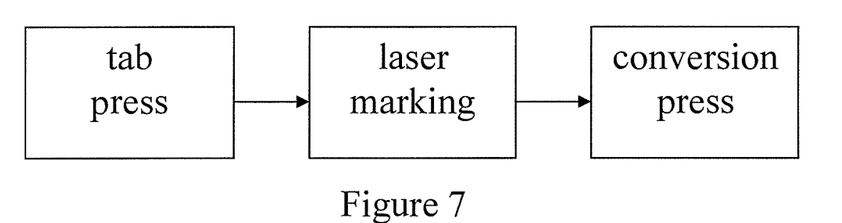
FIG. 7 is a flow chart of a manufacturing process showing another location of the laser marking process.

As illustrated in FIG. 7, the laser marking process may be performed on the tabs after they are formed in the tab press but before they are connected to the end shells in the conversion press.

Figure 8:
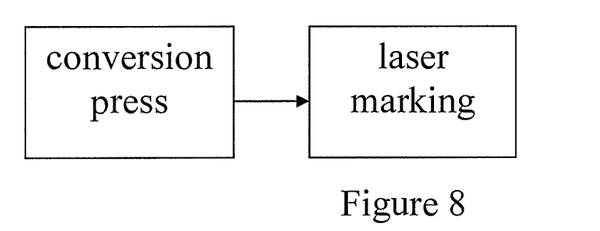
FIG. 8 is a flow chart of a manufacturing process showing another location of the laser marking process.

As illustrated in FIG. 8, the laser marking process may performed on the tabs and/or the can ends, such as the center panel or chuck wall, after the ends are formed in the conversion press.

Figure 9:
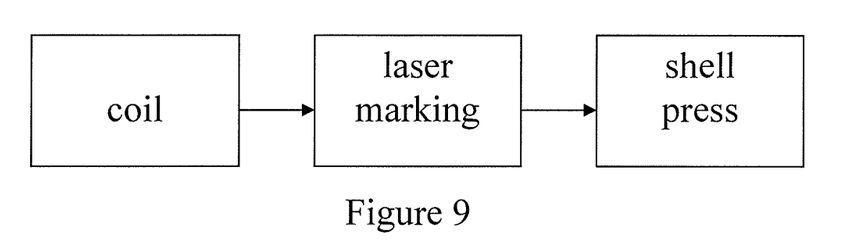
FIG. 9 is a flow chart of a manufacturing process showing another location of the laser marking process.

As illustrated in FIG. 9, the laser marking process may be performed on the can end stock metal on the coil before the metal enters the shell press. In this regard, the laser markings may be formed on the portions of the coil that will be formed into the end center panels and/or chuck walls. Known methods may be employed to register the marked coil for accurate tab forming.

Figure 10:
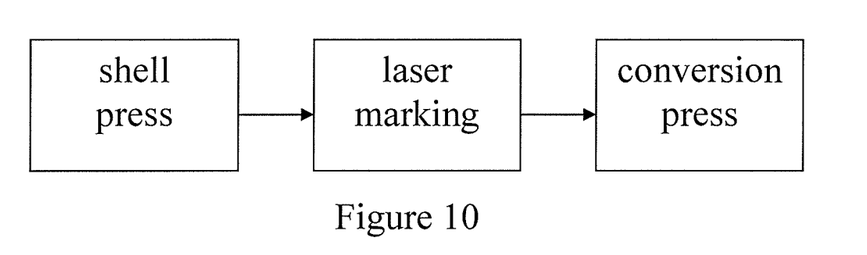
FIG. 10 is a flow chart of a manufacturing process showing another location of the laser marking process.

As illustrated in FIG. 10, the laser marking process may be performed on the can end shells after they are formed in the shell press but before they enter the conversion press. Preferably, for each of the applications described herein, the tab stock coil and/or the end stock coil is supplied from the manufacture with the lacquer pre-applied. The present invention encompasses applying the lacquer at any stage prior to laser marking.

Preferably, a CO2 laser having a characteristic dimension or beam width of less than 50 microns, more preferably less than 30 microns, more preferably less than 10 microns, and preferably approximately 5 microns. A CO2 laser of this type may be employed with the photonically sensitive components commercially supplied by Datalase.

The inventors contemplate using photonically active component in the lacquer of the can end and/or pull tab that changes appearance when irradiated by a laser, preferably a CO2 infra-red laser or a near infra-red laser, to create monochrome black or colored laser images. As used herein, the phrase "photonically active component" encompasses pigments or like compositions that are capable of changing appearance upon application of a laser. In other words, when a laser strikes the material that includes the photonically active component, the photonically active component causes a change in appearance in the component or the lacquer in a way that is visually perceptible. Below are examples of photonically active component technology that the inventors surmise may be employed in the present marking systems, methods, and products.

Various pigments have been proposed to enable marking upon application of a laser. For example, a plastics moulding composition comprising a polyoxymethylene and animal charcoal is disclosed in patent applications WO-A-00/43456, JP-A-11001065, EP-A0522370, EP-A-0797511, and U.S. Pat. Nos. 5,053,440 and 5,350,792. A copper hydroxy phosphate for laser marking is disclosed in U.S. Pat. Nos. 5,928, 780, 6,017,972 and 6,019,831. U.S. Pat. Nos. 5,489,639 and 5,884,079 disclose additional useful compounds.

U.S. Pat. No. 7,485,403 discloses oxyanions of a multivalent metal, especially Ammonium octamolybdate, having the formula $(NH_4)_4Mo_8O_{26}$ ("AOM"), in combination with polymer binders, such as those having a labile group, absorb at the wavelength of CO2 laser light (10,600 nm) and undergo a color change due to a change in oxidation state. The combination is not the temperatures typically encountered in pasteurization.

Also, several compositions have been disclosed that change color or otherwise produce a change in visual appearance upon application of a NIR laser. For example, WO05/068207 discloses the use of NIR laser radiation (i.e. at 800 to 2000 nm) to initiate a color change reaction when a NIR-absorbing metal salt is used in combination with a substance that normally undergoes a color change reaction at much longer wavelength (~10,600 nm), for example AOM. Several metal salts are described; including salts are of copper, such as copper hydroxy phosphate.

JP8127670 discloses the use of reduced titanium oxide compounds for incorporation into thermoplastics, for the laser marking.

U.S. Pat. No. 5,578,120 describes the use of a laser beam-absorbing inorganic substance and a colorant. Examples of the colorants that can be used include those mentioned in JP-A-49-82340, including zinc oxide semiconductors and titanium dioxide semiconductors.

U.S. Pat. No. 5,911,921 discloses the use of non-stoichiometric ytterbium phosphate to produce NIR absorbing inks, such as for printing stealth bar codes.

United States Patent Application Number US20100015558A1 discloses a non-stoichiometric compound such as r-ITO, e.g. in the form of a nanopowder, as an absorber of near infra-red radiation in the region 900 to 2500 nm to create a contrasting image when incorporated in, for example, an AOM-based ink formulation and subjected to laser radiation in the near infrared region of the electromagnetic spectrum (780 to 2500 nm). A metal salt as a functional IR-absorber/color developer material which, on absorption of radiation from a laser source, can directly produce a color-forming reaction when in combination with a component that will otherwise undergo the desired reaction on irradiation at a higher wavelength. For example, it can be used in combination with an oxymetal anion component in an applied coating, to generate a distinct colored image. Alternatively, a color-forming component is used, to generate a distinct image. A fibre, diode, diode array or CO2 laser for imaging applications may be used.

U.S. Pat. No. 6,602,595 discloses the use of non-stoichiometric nano-materials for use in inks, such as r-ITO (reduced indium tin oxide), which acts as an NIR absorber.

WO2009093028A2 discloses a compound that will undergo a color change upon irradiation. The compound has the general structure: $X—C≡C—C≡C—Y—(CO)_n-QZ$ wherein X is H, alkyl or $—Y—(CO)_n-QW$; each Y is the same or a different divalent alkylene group; Q is O, S or NR; R is H or alkyl; W is H, alkyl or Z; each Z is the same or a different unsaturated alkyl group; and each n is 0 or 1.

EP1365923B2 discloses laser marking an object that includes a material including a functional group and a metal compound or acid that causes an elimination reaction on irradiation with a laser, to form a reaction product of contrasting color The process comprises directing a laser beam on to the areas of the object to be marked. For example, by using a carbohydrate and a metal salt, effective marking can be achieved on the coating of a pill or other edible material. The inventors surmise that these compositions may be used on a can end.

United States Patent Application Number US20090117353A1 discloses a method for marking a substrate by coating the substrate with a white or colorless solution of a soluble alkali or alkaline earth metal salt of a weak acid, and then irradiating areas of the substrate to be marked such that those areas change color. The substrate typically comprises a polysaccharide material, preferably a cellulosic material such as cellulose, and the inventors surmise that this process can be employed on a metal substrate such as a can end and/or pull tab. As used herein, the claimed step of applying a laser to the coated substrate encompasses the change in color described in this paragraph.

Preferably, the image produced by the above process produces a dot having a diameter or other characteristic dimension (such as width if the laser marking is producing a line) of no more than approximately 50 microns, preferably no more than approximately 30 microns, more preferably no more than approximately 10 microns, and most preferably approximately 5 microns. It is understood a dot formed as described herein may merge with an adjacent dot. Accordingly, the dot diameter or characteristic dimension may be measured upon initial formation or at other convenient time.

The phrase "substantially without burning, etching, or ablating the lacquer" does not require no loss of matter. The inventors surmise that a light mist coming from the laser beam application when applied in flexible patent applications, in fact, indicates outgassing, loss of volatile matter, or other loss of matter. The present invention encompasses some loss of matter during the application of the laser so long as it does not constitute burning, etching, or ablating, as those terms are commonly understood.

The inventors are aware of a commercial, conventional system for laser etching pull tabs that includes a CO2 laser that often operates at about 100 W. Each lane of a tab press has its own laser such that the tab press can operate at about 700 tabs per minute with a laser having a resolution or dimension of approximately 100 microns. Typically, a dark coloured lacquer is removed by the laser to expose bare aluminum in the form of a simple logo or a few characters. The limitation on the process speed is also a limitation on the amount of decoration.

Laser marking of coatings is employed for flexible and card packaging for various marking applications. Typically, a thermally active pigment is loaded into a transparent or light colored lacquer, and a CO2 laser induces a color change. For example, a laser may be applied to a white lacquer label to display black text. Laser marking systems of this type are available from Sun Chemical, under the trade name Sunlase and employ a 100 micron YAG laser.

We claim:

1. A can end for use on a beverage can, the can end capable of having (i) an unopened configuration in which the end is sealed and (ii) an opened configuration in which, after application of the end to a can body, the contents of the can are accessible, the can end comprising:

an end shell and a pull tab, the pull tab having an orientation that is approximately parallel to a center panel of the end shell in the unopened configuration, the pull tab being capable of being actuated to a part vertical position by lifting an end of the pull tab to rupture a score on the center panel and thereby achieve the opened configuration;

plural images located on a center panel of the end shell, each one of the images being machine-readable, the plural images being located on the center panel such that the pull tab in the unopened configuration obscures a portion of each one of the images regardless of the pull tab's rotational position such that none of the plural images are readable when the beverage can is in its unopened configuration, whereby at least one of the images is fully exposed, intact, and capable of being read by a handheld, wireless communication device upon the tab being actuated to its part vertical position.

2. The end of claim 1 wherein the images are formed from ink jet printing.

3. The can end of claim 1 wherein the images are formed by laser etching.

4. The end of claim 1 wherein each one of the end shell comprises a metal and a coating, the coating comprising a lacquer and a photonically active component; and the images are formed by application of a laser that changes an appearance of at least a portion of the photonically active component substantially without burning, etching, or ablating the lacquer.

5. The end of claim 1 wherein the end is formed of a metal that is an aluminum.

6. The end of claim 1 wherein the end is a beverage can end.

7. The end of claim 1 wherein the end is formed of a metal that is a steel.

8. The end of any of the preceding claims wherein each the images is a QR code.

9. The end of claim 1 wherein images are distributed about a rivet that couples the tab to the center panel.

10. The end of claim 1 further comprising a machine readable code on either one of a topside or an underside of the tab.

11. A method of providing information on a can end, comprising the steps of:

providing a metal can end including: an end shell, a pull tab, and plural images located on a center panel of the end shell, each one of the images being machine-readable, the plural images being located on the center panel such that the pull tab obscures a portion of each one of the images regardless of the rotational position of the pull tab such that none of the plural images are readable; and lifting an end of the pull tab until the pull tab is part vertical to rupture a score on the center panel, whereby in the part vertical position at least one of the images is fully exposed, intact, and capable of being read by a handheld, wireless communication device.

12. The method of claim 11 further comprising the step of reading the image with a machine while the tab is in a part vertical position.

13. The method of claim 11 wherein the images are formed from ink jet printing.

14. The method of claim 11 wherein the images are formed from laser etching.

15. The method of claim 11 wherein each one of the end shell comprises a metal and a coating, the coating comprising a lacquer and a photonically active component; and the images are formed by application of a laser that changes an appearance of at least a portion of the photonically active component substantially without burning, etching, or ablating the lacquer.

16. The method of claim 11 wherein the metal is an aluminum.

17. The method of claim 11 wherein the end is a beverage can end.

18. The method of claim 11 wherein the metal is a steel.

19. The method of claim 11 wherein each the images is a two dimensional barcode.

20. The method of claim 11 wherein images are distributed about a rivet that couples the tab to the center panel.

21. The method of claim 11 wherein the images are equidistantly spaced about a rivet that attaches the tab to the center panel.

22. The method of claim 21 wherein the plural images are four images.

23. The method of claim 21 wherein the plural images are three images.

24. The method of claim 11 further comprising a machine readable code on either one of a topside or an underside of the tab.

25. The method of claim 11 further comprising a machine readable code on the underside of the tab that readable only upon actuation of the tab.

26. A can end capable of having (i) an unopened configuration in which the end is sealed and (ii) an opened configuration in which, after application of the end to a can body, the contents of the can are accessible, the can end comprising:

an end shell and a pull tab, the pull tab including a recess, the pull tab having an orientation that is approximately parallel to a center panel of the end shell in the unopened configuration, the pull tab being capable of being actuated to a part vertical position by lifting an end of the pull tab to rupture a score on the center panel and thereby achieve the opened configuration;

a two dimensional code located on an underside of a structural body of the tab on the recess, wherein the two dimensional code is capable of being read on a handheld wireless communication device when the end is in the opened configuration, the code having a size of no more than 5 mm by 5 mm.

27. The can end of claim 26 wherein the code has a size of at least 2 mm by 2 mm.

28. The can end of claim 26 wherein the code has a size of at least 3 mm by 3 mm.

29. The can end of claim 26 wherein the code has a size of at least 4 mm by 4 mm.

30. The can end of claim 26 wherein the code is a matrix barcode having 14 by 14 modules.

31. The can end of claim 26 wherein the code is one of a matrix barcode and a QR code.

32. The can end of claim 26 wherein the tab consists essentially of the structural body and a hinged portion that is connected to the center panel.

33. The can end of claim 26 wherein the underside of the structural body of the tab is uncovered, thereby enabling the two dimensional code located on the underside of the structural portion to be read when the end is in the opened configuration.

* * * * *